(12) United States Patent
Bolyard, Jr.

(10) Patent No.: US 11,663,357 B2
(45) Date of Patent: May 30, 2023

(54) SYSTEM AND METHOD OF PROVIDING SECURE ACCESS TO PERSONAL INFORMATION

(71) Applicant: David W Bolyard, Jr., Clarksburg, WV (US)

(72) Inventor: David W Bolyard, Jr., Clarksburg, WV (US)

( * ) Notice: Subject to any disclaimer, the term of this patent is extended or adjusted under 35 U.S.C. 154(b) by 0 days.

(21) Appl. No.: 17/948,103

(22) Filed: Sep. 19, 2022

(65) Prior Publication Data

US 2023/0130036 A1    Apr. 27, 2023

Related U.S. Application Data

(63) Continuation-in-part of application No. 17/512,505, filed on Oct. 27, 2021, now abandoned.

(51) Int. Cl.
*G06F 21/62* (2013.01)
*G06F 21/31* (2013.01)

(52) U.S. Cl.
CPC .......... *G06F 21/6245* (2013.01); *G06F 21/31* (2013.01)

(58) Field of Classification Search
CPC ............................ G06F 21/31; G06F 21/6245
See application file for complete search history.

(56) References Cited

U.S. PATENT DOCUMENTS

| | | | | |
|---|---|---|---|---|
| 6,144,959 A | * | 11/2000 | Anderson | G06F 21/31 709/224 |
| 7,783,563 B2 | | 8/2010 | Tidwell | |
| 8,433,617 B2 | | 4/2013 | Goad | |
| 9,218,468 B1 | | 12/2015 | Rappaport | |
| 9,229,905 B1 | * | 1/2016 | Penilla | G06Q 20/18 |
| 10,594,870 B2 | | 3/2020 | Satyavolu | |
| 2011/0029398 A1 | | 2/2011 | Boudville | |
| 2014/0189839 A1 | * | 7/2014 | Jezek | H04L 63/0815 726/8 |
| 2016/0012465 A1 | * | 1/2016 | Sharp | G06Q 20/321 705/14.17 |
| 2017/0140174 A1 | * | 5/2017 | Lacey | G06Q 20/4016 |
| 2019/0019179 A1 | * | 1/2019 | Mtaza | G06Q 20/4016 |
| 2019/0244224 A1 | * | 8/2019 | Tonnison | G06Q 50/188 |
| 2020/0201878 A1 | * | 6/2020 | Putnam | G06F 16/972 |

OTHER PUBLICATIONS

NPL Search Terms (Year: 2023).*

* cited by examiner

*Primary Examiner* — Syed A Zaidi

(57) ABSTRACT

A system including at least one remote server and a corresponding user personal computing (PC) device implements a method of providing secure access to personal information. The remote server manages at least one user account and a plurality of business profiles. The user account is associated with a corresponding user PC device and includes personal information and a user access code. The method begins by receiving an access code attempt for the user account with the corresponding user PC device. The access code attempt is relayed from the corresponding user PC device to the remote server. The method continues by receiving at least one service request associated to at least one specific business profile with the corresponding user PC device. The service request is relayed from the corresponding user PC device to the remote server. The specific business profile is granted access to the personal information with the remote server.

8 Claims, 12 Drawing Sheets

SYSTEM AND METHOD OF PROVIDING SECURE ACCESS TO PERSONAL INFORMATION

The current application is a continuation-in-part (CIP) application of the U.S. non-provisional application Ser. No. 17/512,505 filed on Oct. 27, 2021.

FIELD OF THE INVENTION

The present invention relates generally to internet security. More particularly, the present invention relates to verification of personal information while providing secure access to personal information.

BACKGROUND OF THE INVENTION

Identity theft is has grown to be a common problem for individuals especially as most sensitive information is entered and processed online. Simply entering personal information into a website or clicking a wrong link can compromise any information that has been entered onto a website or saved online.

It is therefore an objective of the present invention to provide an additional layer of protection while on the internet. The present invention eliminated the need to enter personal information into a textbox online. The present invention stores all personal information and automatically provides the information as needed only if correctly verified. The present invention identifies each user by location, utilizing 4myIDlock.com, before providing protected personal information.

DETAIL DESCRIPTIONS OF THE INVENTION

All illustrations of the drawings are for the purpose of describing selected versions of the present invention and are not intended to limit the scope of the present invention.

Figure 1:
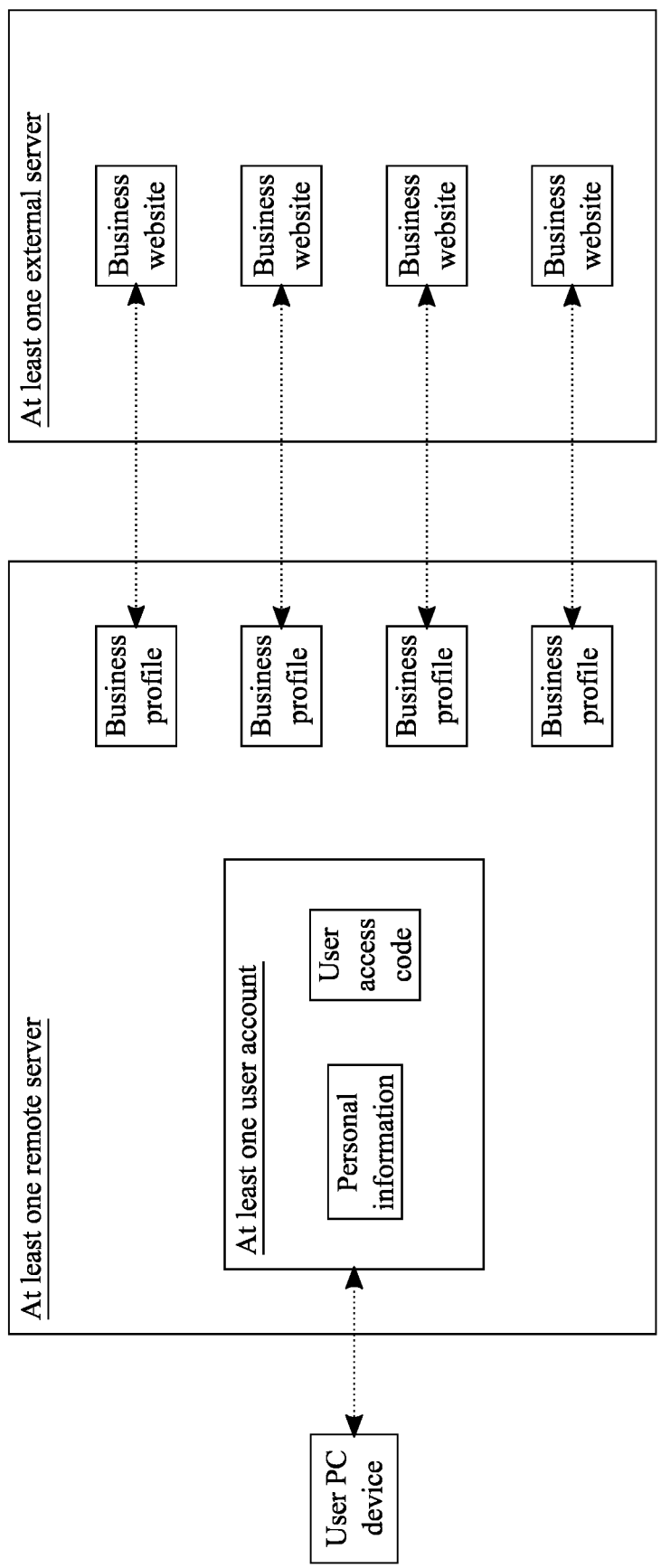
FIG. 1 is a general block diagram of the system of the present invention.

The present invention is a system and method of providing secure access to personal information. The present invention verifies the identity of a user and automatically inputs the personal information into a corresponding textbox of a website, thus eliminating or significantly reducing identity theft. Thus, the physical system used to implement the method for the present invention includes at least one remote server and a corresponding user personal computing (PC) device (Step A), as seen in FIG. 1. At least one user account and a plurality of business profiles are managed by the at least one remote server, wherein the user account is accessible to an operator/user through the corresponding user PC device because the corresponding user PC device is communicably coupled to the remote server. The communicable coupling between the corresponding user PC device and the remote server is preferably a wireless communication line but can alternatively be a hardwired communication line. The user account allows the remote server to virtually distinguish and identify an operator/user that is interacting with the present invention. Similar to the user account, each business profile allows the remote server to virtually distinguish and identify a commercial entity (e.g., an online business) that is interacting with the present invention. The remote server is used to manage, store, and communicate data being processed by the present invention and acts as a hub to exchange data between different entities managed by the present invention. The corresponding user PC device allows an operator/user to access their user account on the present invention and acts as an interface between the operator/user and the present invention so that the operator/user can enter inputs into the present invention and can receive outputs from the present invention. The corresponding user PC device is also used by an operator/user to adjust and edit their user account, to navigate and review the plurality of business profiles, and to be notified of possible or confirmed identity theft issues. The corresponding user PC device can be, but is not limited to, a desktop, a laptop, a tablet PC device, or a mobile PC device (e.g., a smart phone).

Furthermore, the user account includes personal information and a user access code. The personal information can be, but is not limited to, a name, an address, a social security number, some piece of demographic information, a bank account number, a credit card number, or a combination thereof. In order to protect the information from being accessed by another online entity or another user account, the user access code is a unique sequence of characters, which can be at least one alphanumerical character, at least one special character, or a combination thereof. Moreover, the user access code differentiates one user account from another user account as the combination of alphanumerical characters and special characters provide unique identification for each user account.

Figure 2:
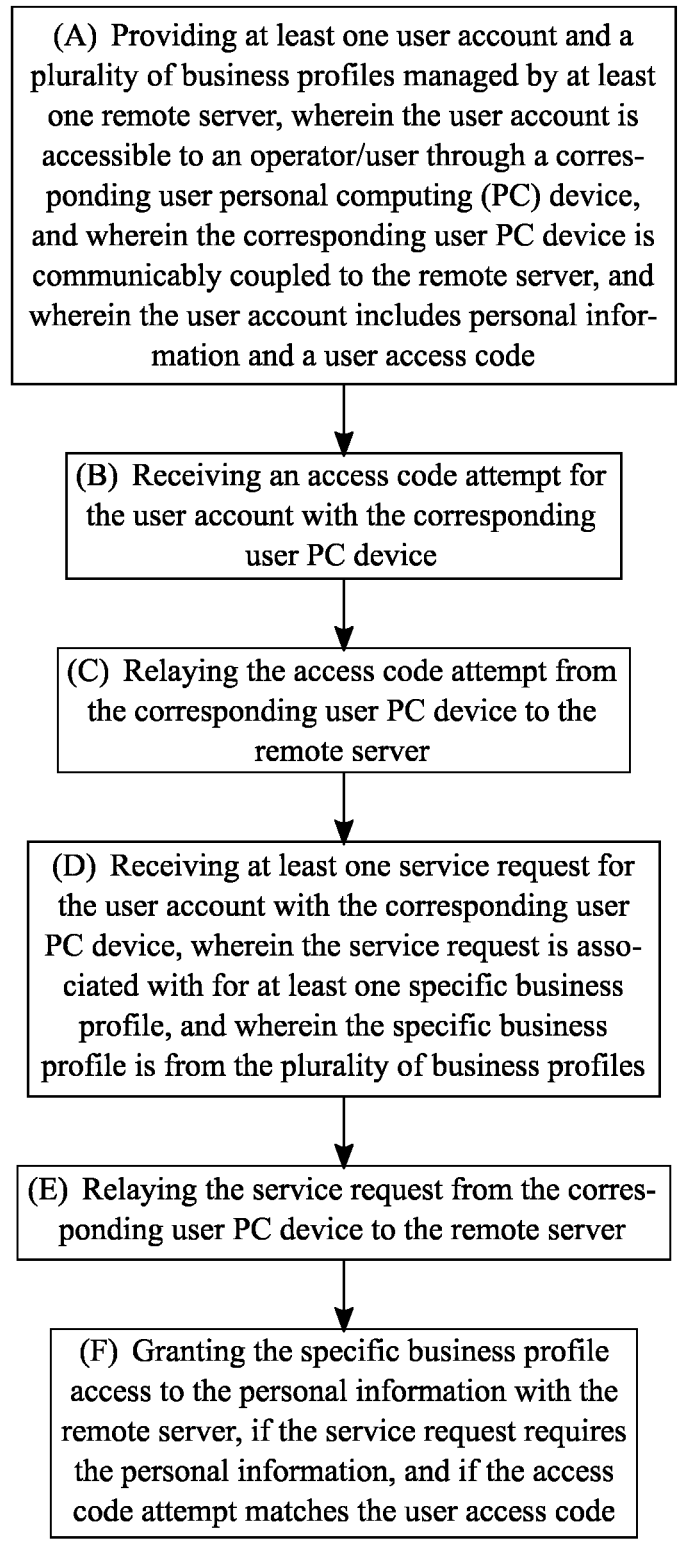
FIG. 2 is a flowchart illustrating the general method of the present invention.

The overall process for the method of the present invention includes the following steps that are implemented with the at least one remote server and the corresponding user PC device. As seen in FIG. 2, the overall process begins by receiving an access code attempt for the user account with the corresponding user PC device (Step B), wherein the access code attempt is typically entered by an operator/user trying to access their user account on the present invention. The access code attempt is the entry of a unique sequence of characters and/or numbers. The access code attempt is then relayed from the corresponding user PC device to the remote server (Step C) so that the necessary verification information for the operator/user can be processed by the remote server. The overall process continues by receiving at least one service request for the user account with the corresponding user PC device (Step D), wherein the service request is typically selected/entered by an operator/user trying use a functional feature of the present invention, and wherein the specific business profile is from the plurality of business profiles. The service request can be a request for verified information related to the user account that is required by the specific business profile or can be an online transaction (e.g., an online purchase) associated with at least one specific business profile. The service request is then relayed from the corresponding user PC device to the remote server (Step E) so that the service request by the operator/user can be processed by the remote server. The overall process concludes by granting the specific business profile access to the personal information with the remote server (Step F), if the service request requires the personal information, and if the access code attempt matches the user access code. Step F thus verifies the operator/user as someone that can provide a business profile with access to their personal information stored on the remote server.

Figure 3:
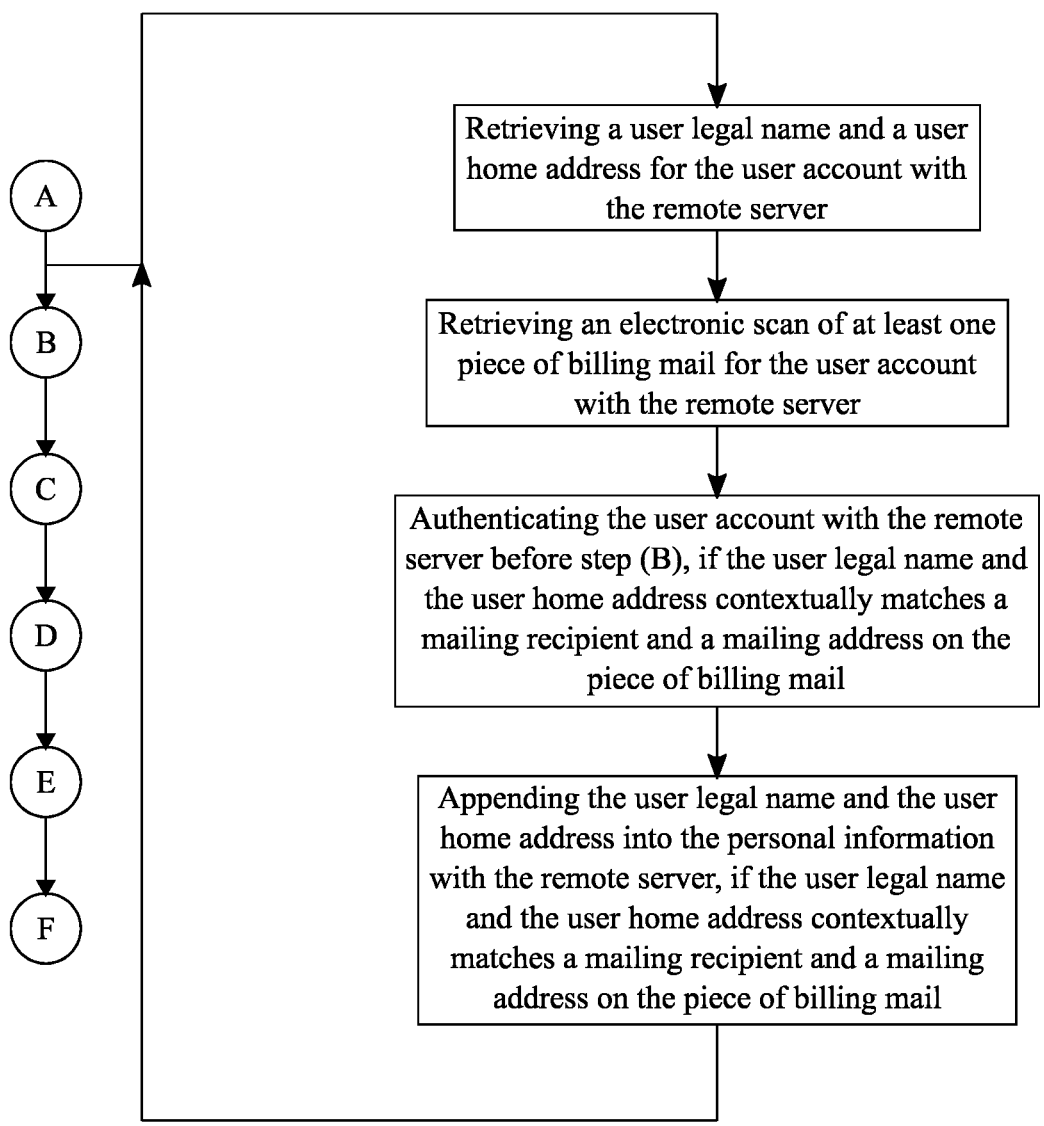
FIG. 3 is a flowchart illustrating the subprocess of associating a user legal name and a user home address into the personal information of a user account for the present invention.

In order to validate the user account, a user legal name and a user home address for the user account is retrieved with the remote server, as seen in FIG. 3. The user legal name is the name of an operator/user associated with the user account and is used by a government to identify the operator/user. The user home address is the physical address for the living location of an operator/user associated to the user account. In order to corroborate the user legal name with the user home address, the remote server retrieves an electronic scan of at least one piece of billing mail for the user account. The electronic scan of the piece of billing mail can serve as proof of the user legal name and the user home address because the mailing recipient and the mailing address should correspond with the user legal name and the user home address. Thus, the remote server is able to authenticate the user account before Step B, if the user legal name and the user home address contextually matches a mailing recipient and a mailing address on the piece of billing mail. The remote server finally appends the user legal name and the user home address into the personal information, if the user legal name and the user home address contextually matches a mailing recipient and a mailing address on the piece of billing mail, thereby further differentiating the user account from another user account and providing increased protection of the personal information of the user account.

Figure 4:
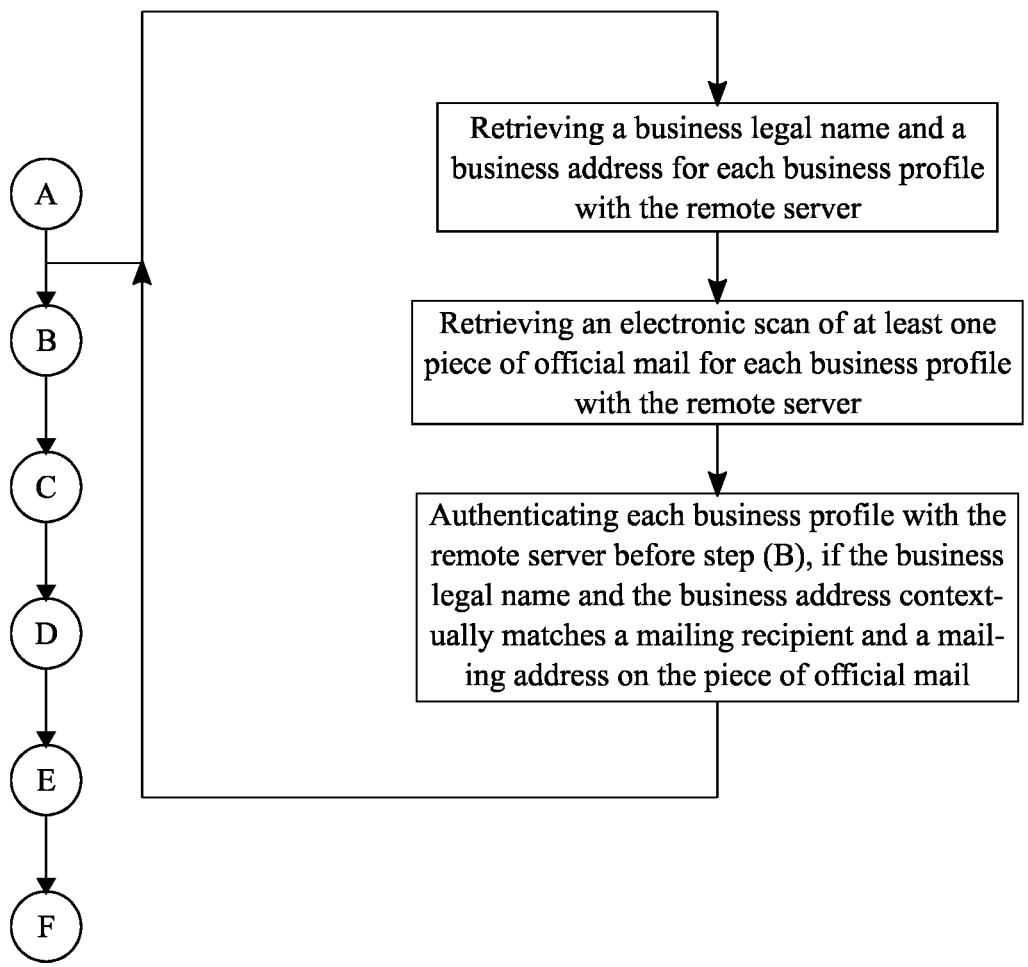
FIG. 4 is a flowchart illustrating the subprocess of verifying the authenticity of a business profile for the present invention.

In order to verify the authenticity of a business, a business legal name and a business address is retrieved for each business profile with the remote server, as seen in FIG. 4. The business legal name is the name of a commercial entity associated to a business profile. The business address is the physical address of a commercial entity associated to a business profile. The remote server then retrieves an electronic scan of at least one piece of official mail for each business profile. The electronic scan of the piece of official mail serves as proof of the business legal name and the business address because the mailing recipient and the mailing address should correspond with the business legal name and the business home address. Thus, the remote server is able to authenticate each business profile before Step B, if the business legal name and the business address contextually matches a mailing recipient and a mailing address on the piece of official mail. The mailing recipient needs to correspond with the business legal name, and the mailing address needs to correspond with the business address, which allows the present invention to authenticate a commercial entity and to consequently provide the commercial entity with a business profile managed by the remote server.

Figure 5:
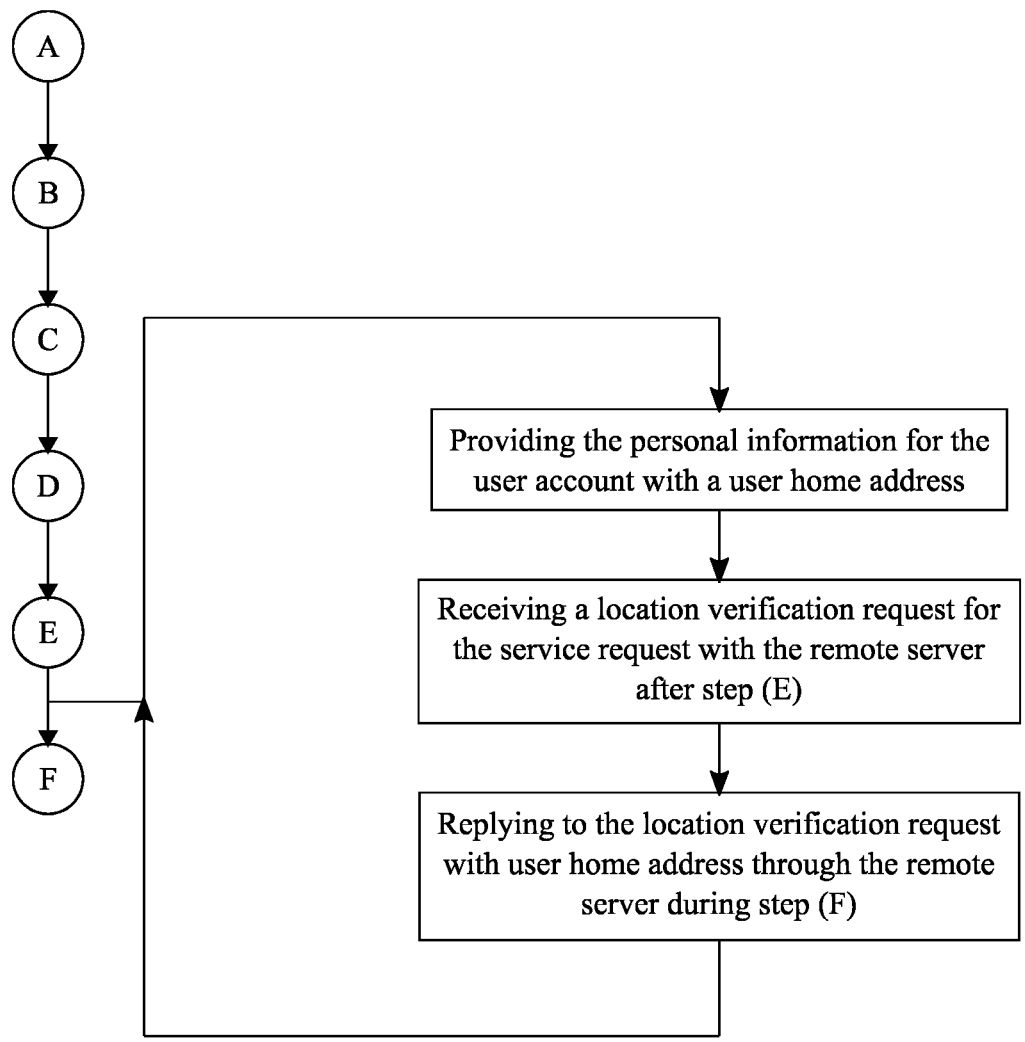
FIG. 5 is a flowchart illustrating the subprocess of providing a business profile with the necessary personal information once a user home address is verified for the present invention.

In order to effectively confirm the identity of the user account while attempting to access personal information of a user account, the personal information for the user account is provided with a user home address, as seen in FIG. 5. The user home address is the physical address for anything that needs to be shipped to an operator/user associated to the user account. A location verification request for the service request is received with the remote server after Step E. The location verification request retrieves only the requested personal information of the user account (i.e., the home address of the operator/user) for the specific business profile. The remote server then replies to the location verification request with the user home address during Step F, thereby providing a commercial entity associated to the specific business profile with access to the personal information that corresponds and may be automatically inputted into a textbox on a website for the specific business profile.

Figure 6:
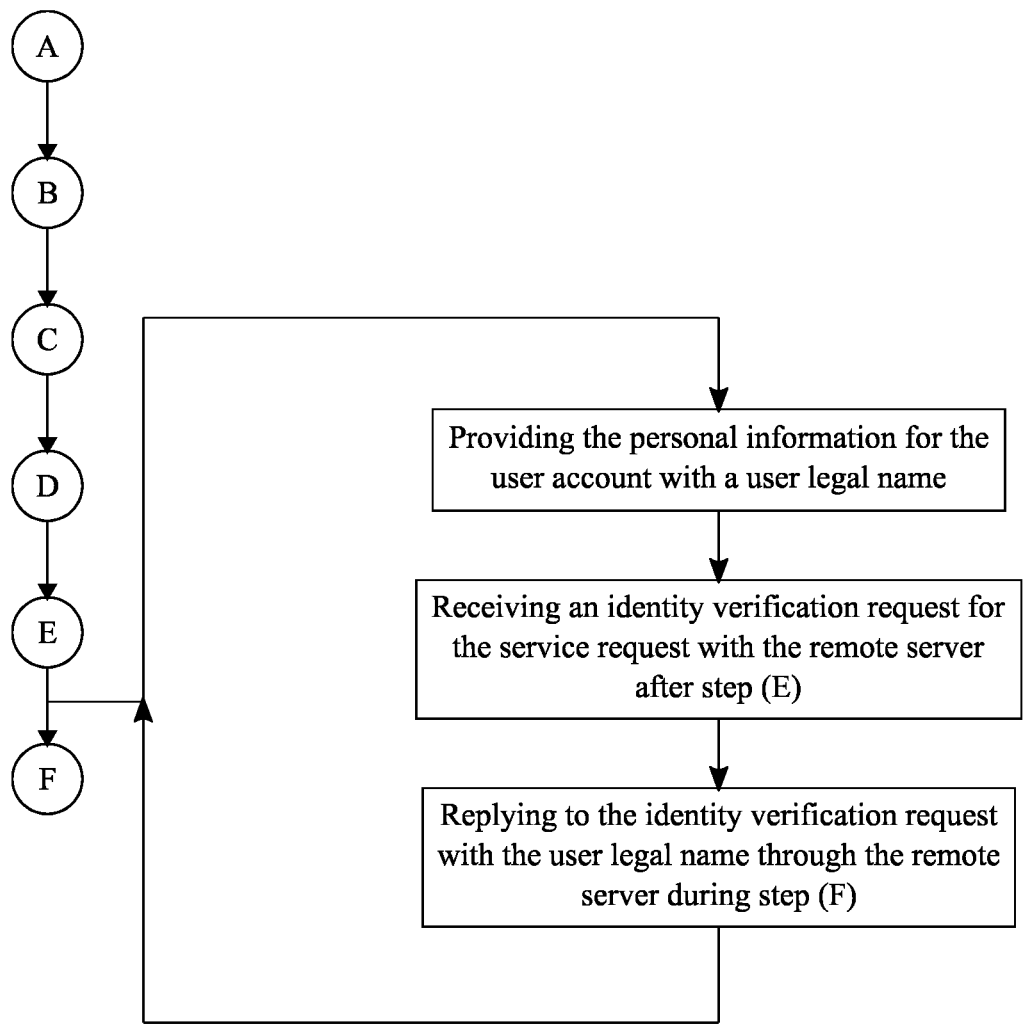
FIG. 6 is a flowchart illustrating the subprocess of providing a business profile with the necessary personal information once a user legal name is verified for the present invention.

Furthermore, in order to effectively confirm the identity of the user account while attempting to access personal information of a user account, the personal information for the user account is provided with a user legal name, as seen in FIG. 6. The user legal name is a full name of an operator/user associated to the user account, wherein the full name is registered with a government. An identity verification request for the service request is received with the remote server after Step E. The identity verification request retrieves only the requested personal information of the user account (i.e., the user legal name of an operator/user associated to the user account) for the specific business profile. The remote server then replies to the identity verification request with the user legal name during Step F, thereby providing a commercial entity associated to the specific business profile with access to the personal information that corresponds and may be automatically inputted into a textbox on a website for the specific business profile.

Figure 7:
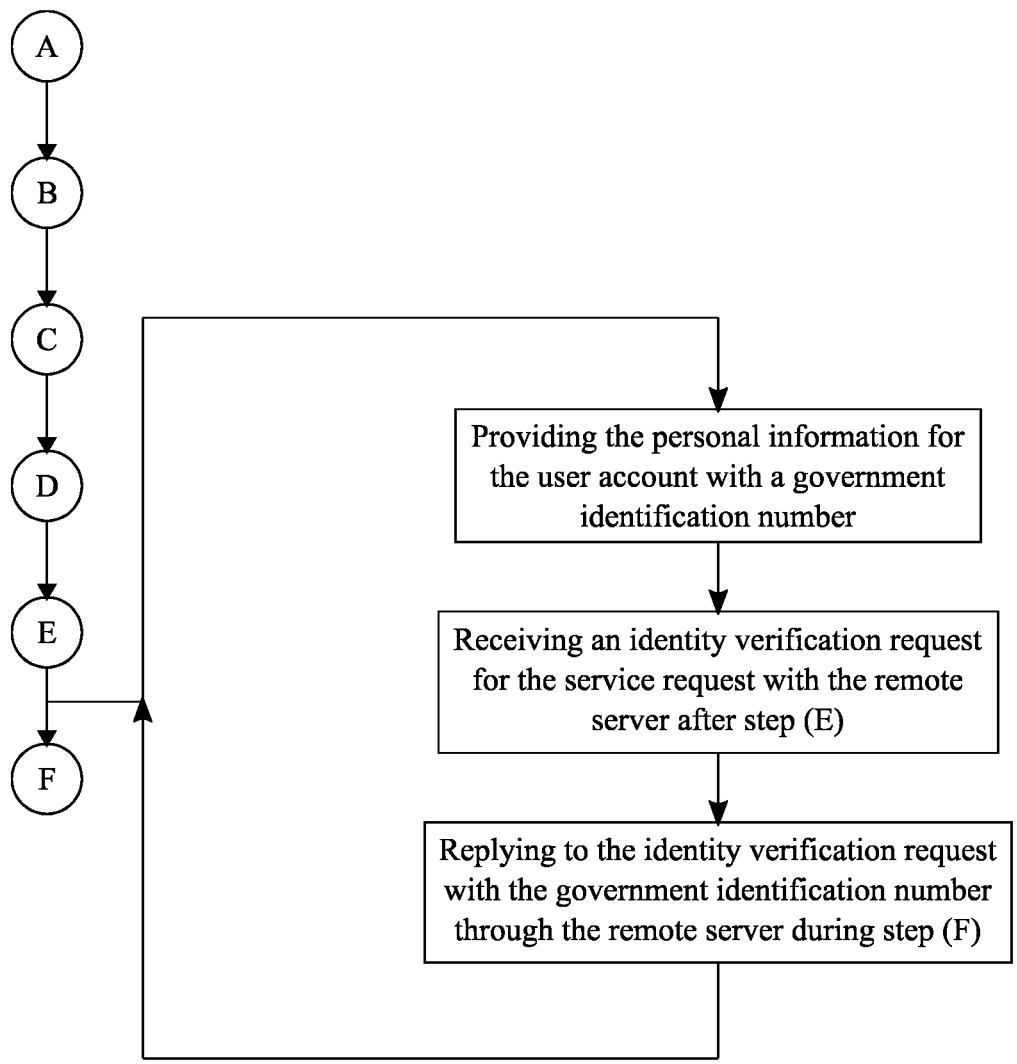
FIG. 7 is a flowchart illustrating the subprocess of providing a business profile with the necessary personal information once a government identification number is verified for the present invention.

Furthermore, in order to effectively confirm the identity of the user account while attempting to access personal information of a user account, the personal information for the user account is provided with a government identification number, as seen in FIG. 7. The government identification number can be, but is not limited to, a U.S. social security number of an operator/user associated to the user account and is registered with the U.S. government. An identity verification request for the service request is received with the remote server after Step E. The identity verification request retrieves only the required personal information of the user account (i.e., the government identification number of an operator/user associated to the user account) for the specific business profile. The remote server then replies to the identity verification request with the government identification number during Step F, thereby providing a commercial entity associated to the specific business profile with access to the personal information that corresponds and may be automatically inputted into a textbox on a website for the specific business profile.

Figure 8:
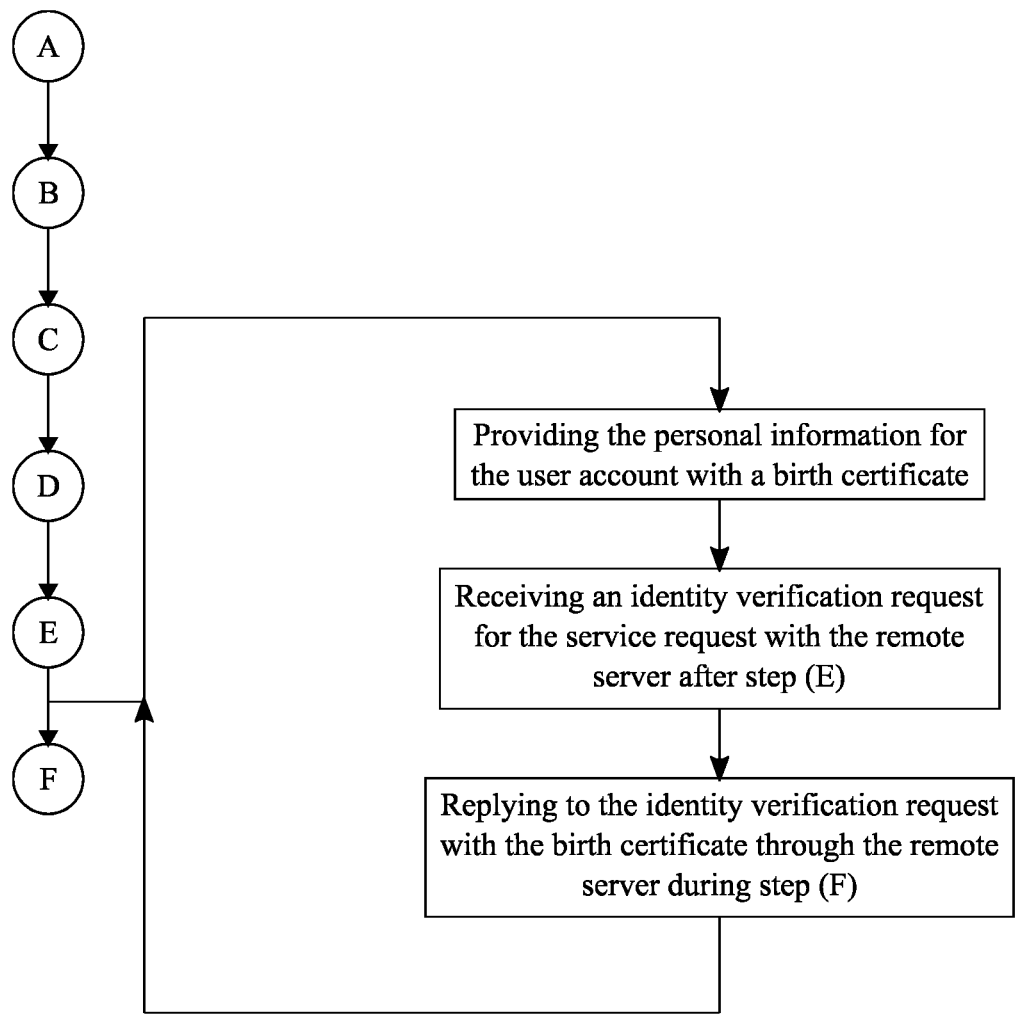
FIG. 8 is a flowchart illustrating the subprocess of providing a business profile with the necessary personal information once a birth certificate is verified for the present invention.

Furthermore, in order to effectively confirm the identity of the user account while attempting to access personal information of a user account, the personal information for the user account is provided with a birth certificate, as seen in FIG. 8. The birth certificate is an official government record of the birth of an operator/user associated to the user account. An identity verification request for the service request is received with the remote server after Step E. The identity verification request retrieves only the requires personal information of the user account (i.e., the birth certificate of an operator/user associated to the user account) for the specific business profile. The remote server then replies to the identity verification request with the birth certificate during Step F, thereby providing a commercial entity associated to the specific business profile with access to the personal information that corresponds and may be automatically inputted into a textbox on a website for the specific business profile.

Figure 9:
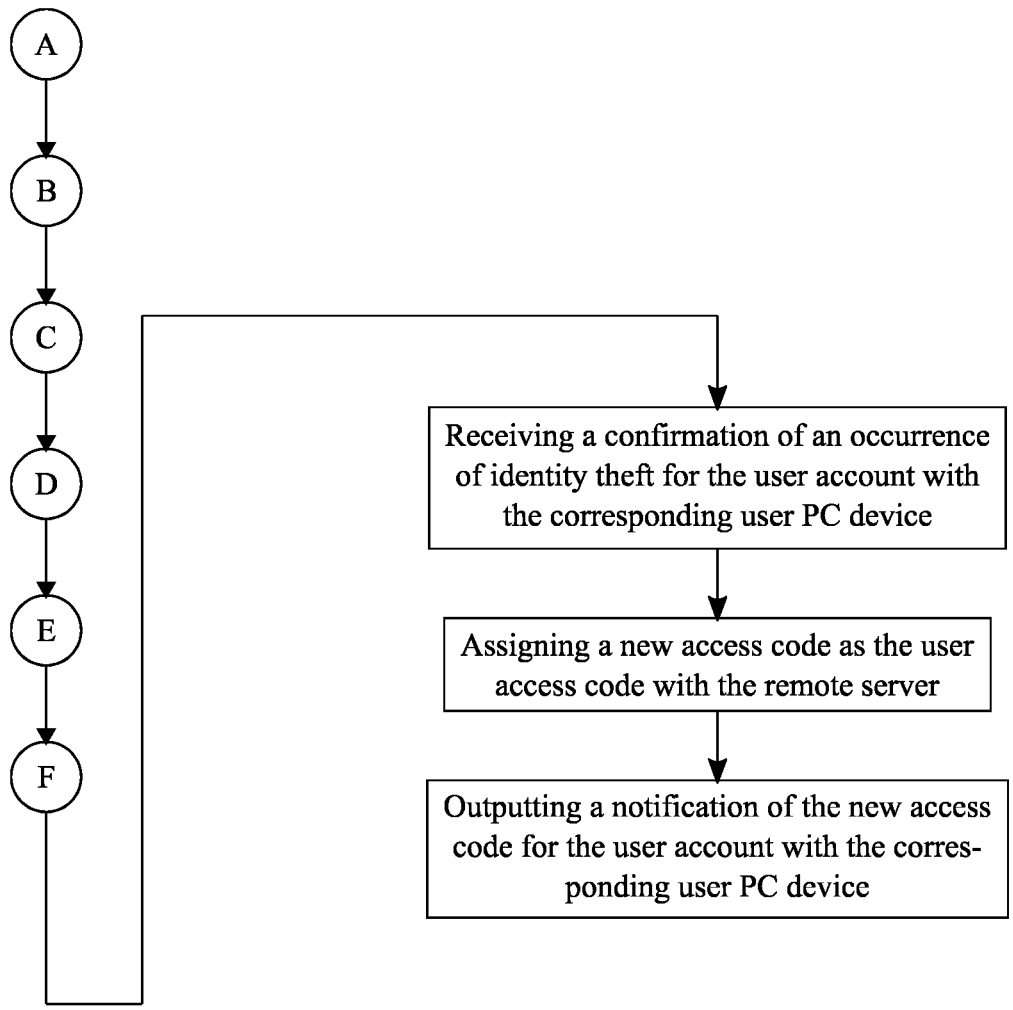
FIG. 9 is a flowchart illustrating the subprocess of the user account checking for an occurrence of identity theft for the present invention.

In order to check if the identity of the user account has been stolen, the corresponding user PC device receives a confirmation of an occurrence of identity theft for the user account, as seen in FIG. 9. The occurrence of identity theft is theft of some or all of the personal information for the user account. In order to prevent future unwanted access to the personal information, the remote server assigns a new access code as the user access code. The new access code is a different unique sequence of characters that has not already been associated with the user account or another user account. The corresponding user PC device finally outputs a notification of the new access code for the user account providing the operator/user with another security measure against identity theft.

Figure 10:
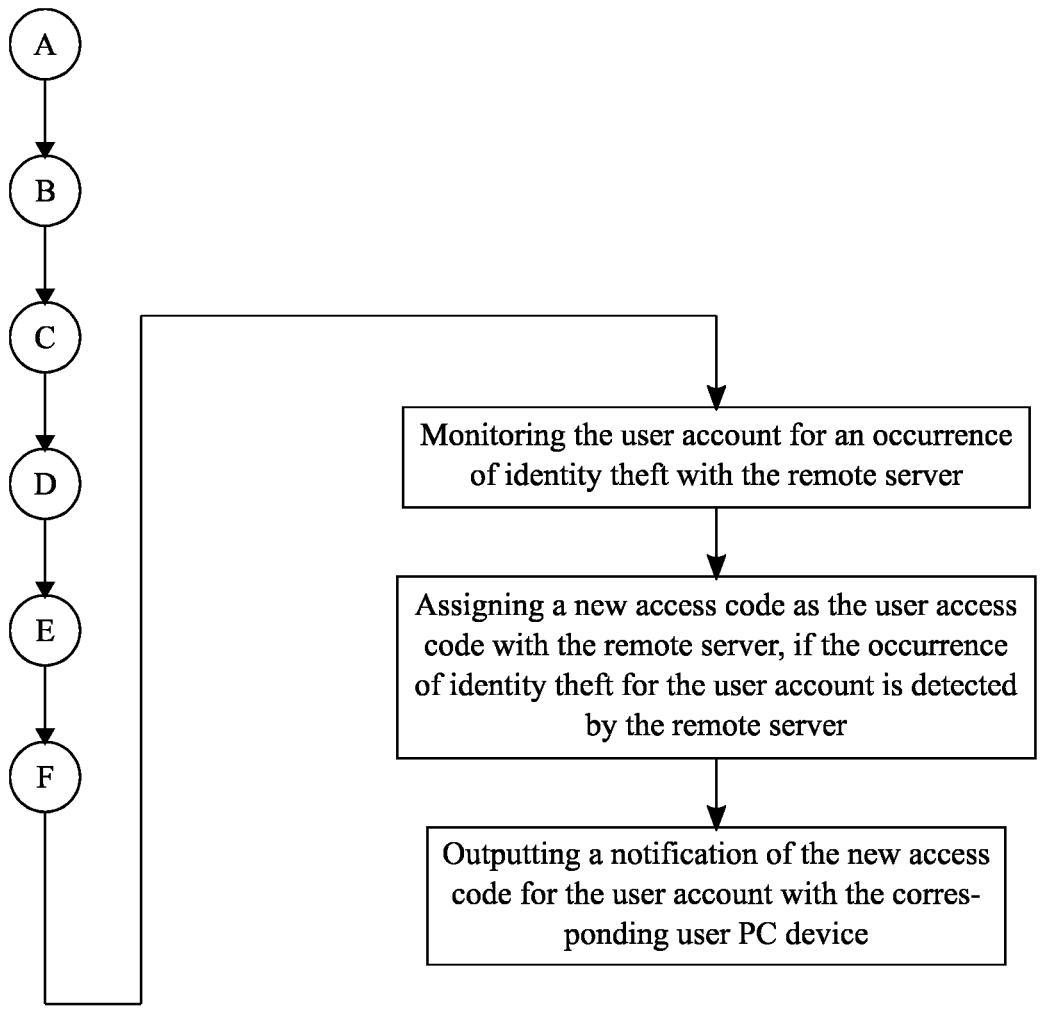
FIG. 10 is a flowchart illustrating the subprocess of automatically alerting the user account of an incidence of identity theft for the present invention.

In order for the user account to be automatically made aware of identity theft, the user account is monitored for an occurrence of identity theft with the remote server, as seen in FIG. 10. The occurrence of identity theft is theft of some or all of the personal information for the user account. In order to prevent future unwanted access to the personal information, the remote server assigns a new access code as the user access code, if the occurrence of identity theft for the user account is detected by the remote server. The new access code is a unique sequence of characters that has not already been associated with the user account or another user account. The corresponding user PC device finally outputs a notification of the new access code for the user account providing the operator/user with another security measure against identity theft.

Figure 11:
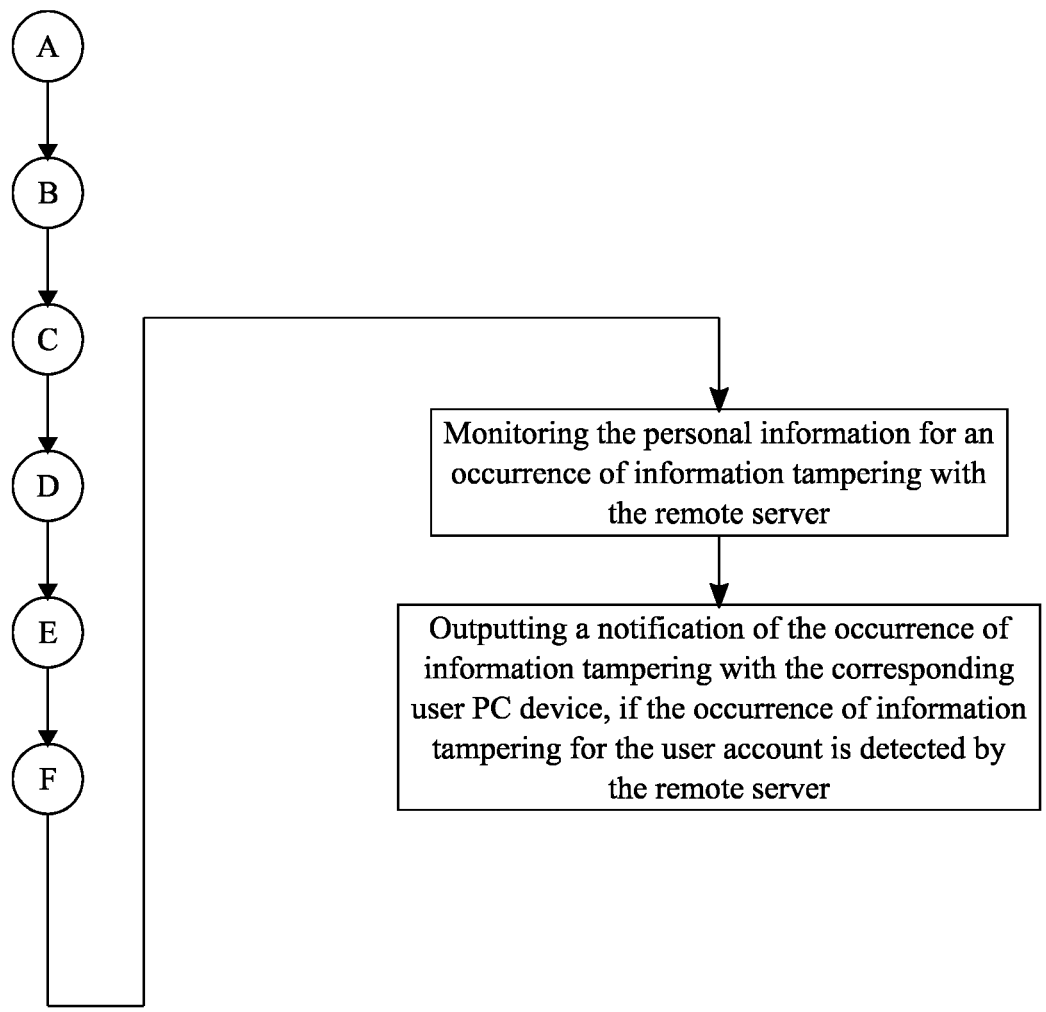
FIG. 11 is a flowchart illustrating the subprocess of automatically alerting the user account checking for an incidence of information tampering for the present invention.

In order for the user account to be automatically made aware of an attempt of a change of address or a change of some other personal information, the personal information is monitored for an occurrence of information tampering with the remote server, as seen in FIG. 11. The occurrence of information tampering is an instance that an unknown online entity or another user account attempts to use or alter the personal information of the user account such as a home address. The corresponding user PC device outputs a notification of the occurrence of information tampering, if the incidence of information tampering for the user account is detected by the remote server, so that the user account may be alerted of and confirm the incidence of information tampering.

Figure 12:
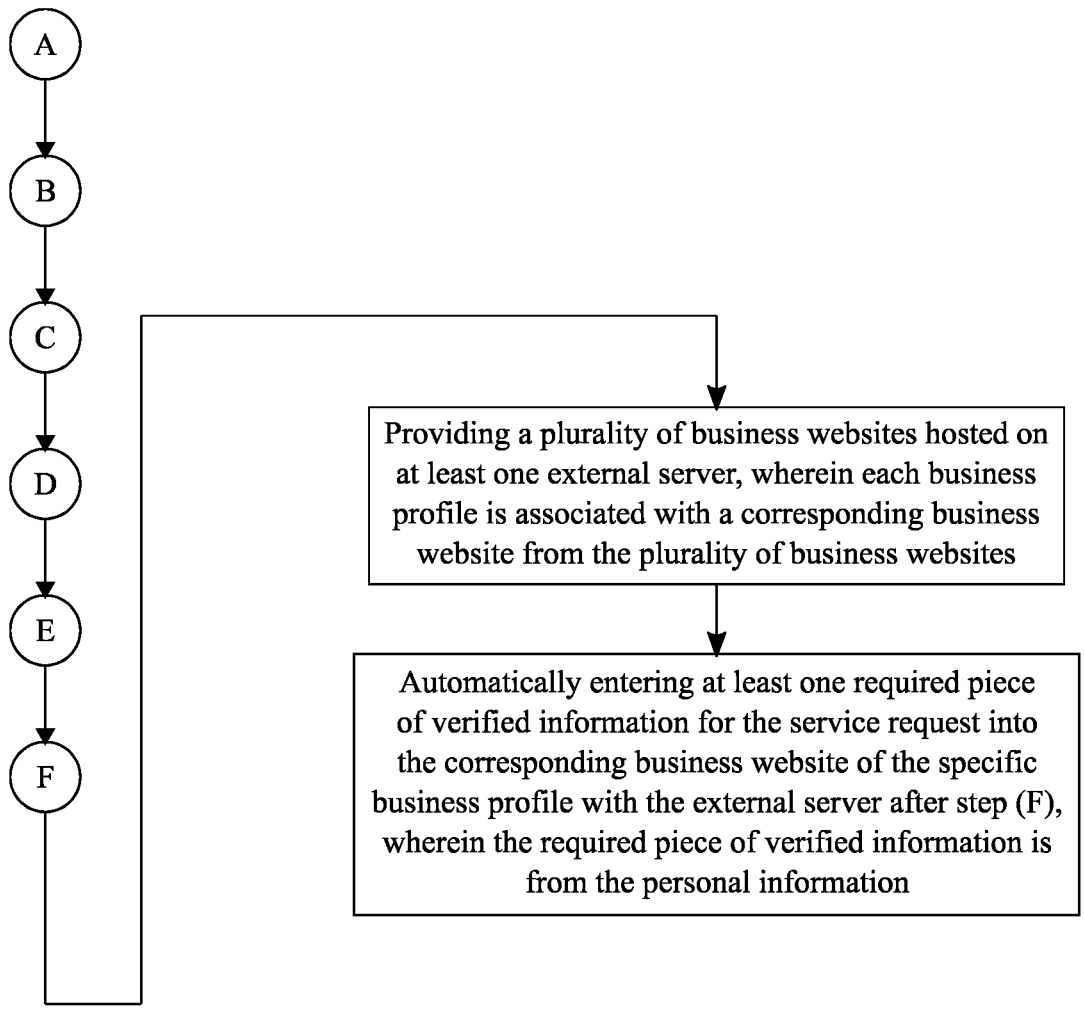
FIG. 12 is a flowchart illustrating the subprocess of automatically entering at least one required piece of verified information for the service request into a business website.

The present invention also allows personal information to be automatically inputted into a textbox on a website for the specific business profile, as seen in FIG. 12. Thus, the present invention may be provided with a plurality of business websites hosted on at least one external server, which is used to manage, store, and communicate data being processed by any one of the plurality of business websites. Each business website is used to conduct electronic/online commerce that is related to a business profile, and, consequently, each business profile is associated to a corresponding business website from the plurality of business websites. Moreover, the external server can be used to automatically enter at least one required piece of verified information for the service request into the corresponding business website of the specific business profile after Step F because Step F grants the specific business profile access to the personal information stored on the remote server, and the required piece of verified information is from the personal information. As one example, the required piece of verified information can be a user's name, the user's physical address, or some other piece of demographic information about the operator/user that is required by the service request to be automatically inputted into a textbox on the corresponding business website of the specific business profile. As another example, the required piece of verified information can be a user's payment information that is required by the service request to be inputting into a payment webpage on the corresponding business website of the specific business profile.

Although the invention has been explained in relation to its preferred embodiment, it is to be understood that many other possible modifications and variations can be made without departing from the spirit and scope of the invention as hereinafter claimed.

What is claimed is:

1. A method of providing secure access to personal information, the method comprising steps of:
(A) providing at least one user account and a plurality of business profiles, wherein the user account and the plurality of business profiles are exclusively managed by at least one remote server, wherein the user account is accessible to an operator/user through a corresponding user personal computing (PC) device, and wherein the corresponding user PC device is communicably coupled to the remote server, and wherein the user account includes personal information and a user access code, and wherein a plurality of business websites is exclusively hosted on at least one external server, wherein each business profile is associated with a corresponding business website from the plurality of business websites, and wherein the user access code is a unique sequence of characters, and wherein the unique sequence of characters is selected from a group consisting of: at least one alphanumerical character, at least one special character, and combination thereof;
(B) receiving an access code attempt for the user account with the corresponding user PC device;
(C) relaying the access code attempt from the corresponding user PC device to the remote server;
(D) receiving at least one service request for the user account with the corresponding user PC device, wherein the service request is associated with for at least one specific business profile, and wherein the specific business profile is from the plurality of business profiles;
(E) relaying the service request from the corresponding user PC device to the remote server;

(F) granting the specific business profile access to the personal information with the remote server, if the service request requires the personal information, and if the access code attempt matches the user access code;
sequentially executing steps (B) through (F);
automatically entering at least one required piece of verified information for the service request into the corresponding business website of the specific business profile with the external server after step (F), wherein the required piece of verified information is from the personal information;
assigning a new access code as the user access code with the remote server, if a confirmation of an occurrence of identity theft for the user account is received with the corresponding user PC device, and/or if an occurrence of identity theft for the user account is monitored by the remote server; and,
outputting a notification of the new access code for the user account with the corresponding user PC device.

2. The method of providing secure access to personal information, the method as claimed in claim 1 comprising steps of:
retrieving a user legal name and a user home address for the user account with the remote server;
retrieving an electronic scan of at least one piece of billing mail for the user account with the remote server;
authenticating the user account with the remote server before step (B), if the user legal name and the user home address contextually matches a mailing recipient and a mailing address on the piece of billing mail; and,
appending the user legal name and the user home address into the personal information with the remote server, if the user legal name and the user home address contextually matches a mailing recipient and a mailing address on the piece of billing mail.

3. The method of providing secure access to personal information, the method as claimed in claim 1 comprising steps of:
retrieving a business legal name and a business address for each business profile with the remote server;
retrieving an electronic scan of at least one piece of official mail for each business profile with the remote server; and,
authenticating each business profile with the remote server before step (B), if the business legal name and the business address contextually matches a mailing recipient and a mailing address on the piece of official mail.

4. The method of providing secure access to personal information, the method as claimed in claim 1 comprising steps of:
providing the personal information for the user account with a user home address;
receiving a location verification request for the service request with the remote server after step (E); and,
replying to the location verification request with user home address through the remote server during step (F).

5. The method of providing secure access to personal information, the method as claimed in claim 1 comprising steps of:
providing the personal information for the user account with a user legal name;
receiving an identity verification request for the service request with the remote server after step (E); and,
replying to the identity verification request with the user legal name through the remote server during step (F).

6. The method of providing secure access to personal information, the method as claimed in claim 1 comprising steps of:
providing the personal information for the user account with a government identification number;
receiving an identity verification request for the service request with the remote server after step (E); and,
replying to the identity verification request with the government identification number through the remote server during step (F).

7. The method of providing secure access to personal information, the method as claimed in claim 1 comprising steps of:
providing the personal information for the user account with a birth certificate;
receiving an identity verification request for the service request with the remote server after step (E); and,
replying to the identity verification request with the birth certificate through the remote server during step (F).

8. The method of providing secure access to personal information, the method as claimed in claim 1 comprising steps of:
monitoring the personal information for an occurrence of information tampering with the remote server; and,
outputting a notification of the occurrence of information tampering with the corresponding user PC device, if the occurrence of information tampering for the user account is detected by the remote server.

* * * * *